(12) United States Patent
Cradick et al.

(10) Patent No.: US 9,760,441 B2
(45) Date of Patent: *Sep. 12, 2017

(54) RESTORATION OF CONSISTENT REGIONS WITHIN A STREAMING ENVIRONMENT

(71) Applicant: International Business Machines Corporation, Armonk, NY (US)

(72) Inventors: Ryan K. Cradick, Oronoco, MN (US); Gabriela Jacques da Silva, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/815,430

(22) Filed: Jul. 31, 2015

(65) Prior Publication Data
US 2017/0033979 A1 Feb. 2, 2017

Related U.S. Application Data

(63) Continuation of application No. 14/814,220, filed on Jul. 30, 2015.

(51) Int. Cl.
*G06F 11/30* (2006.01)
*G06F 11/14* (2006.01)
(Continued)

(52) U.S. Cl.
CPC ...... *G06F 11/1402* (2013.01); *G06F 11/3006* (2013.01); *G06F 11/3409* (2013.01);
(Continued)

(58) Field of Classification Search
CPC ............... G06F 11/1402; G06F 11/302; G06F 11/3006; G06F 11/3409
See application file for complete search history.

(56) References Cited

U.S. PATENT DOCUMENTS 6,920,635 B1 7/2005 Lodrige et al.
8,028,120 B2 9/2011 Mo et al.
(Continued)

OTHER PUBLICATIONS

Cradick et al., "Restoration of Consistent Regions Within a Streaming Environment" U.S. Appl. No. 14/814,220, filed Jul. 30, 2015.
(Continued)

*Primary Examiner* — Yolanda L Wilson
(74) *Attorney, Agent, or Firm* — Patterson + Sheridan, LLP

(57) ABSTRACT

A streams manager intelligently restores multiple consistent regions of streaming applications in a streaming environment to increase performance and reduce overloading of other operators and resources. The streams manager detects a failure that affects multiple consistent regions and determines a preferred schedule to restore the multiple consistent regions by analyzing the relationships of the operators and resources associated with the multiple consistent regions. The streams manager may create a dependency graph that maps the interrelationships of the operators and resources associated with the consistent regions of the streaming application and then consult the dependency graph to determine the schedule to restore the multiple consistent regions affected by the failure.

8 Claims, 9 Drawing Sheets

(51) Int. Cl.
| | |
|---|---|
| *G06F 11/34* | (2006.01) |
| *H04L 12/24* | (2006.01) |
| *H04L 12/26* | (2006.01) |
| *H04L 29/08* | (2006.01) |

(52) U.S. Cl.
CPC ...... *H04L 41/0654* (2013.01); *H04L 41/0672* (2013.01); *H04L 41/0816* (2013.01); *H04L 43/08* (2013.01); *H04L 43/0817* (2013.01); *H04L 67/025* (2013.01); *G06F 2201/805* (2013.01)

(56) References Cited

U.S. PATENT DOCUMENTS

| | | | | |
|---|---|---|---|---|
| 8,261,122 | B1* | 9/2012 | Kappel | G06F 11/1402 714/2 |
| 8,996,796 | B1 | 3/2015 | Karamcheti et al. | |
| 9,098,333 | B1* | 8/2015 | Obrecht | G06F 9/50 |
| 2003/0050956 | A1* | 3/2003 | Janssen | G06F 11/3017 709/201 |
| 2008/0320263 | A1 | 12/2008 | Nemiroff et al. | |
| 2012/0137164 | A1 | 5/2012 | Uhlig et al. | |
| 2013/0054779 | A1* | 2/2013 | Cradick | G06F 15/173 709/224 |
| 2014/0059212 | A1* | 2/2014 | Gedik | G06F 9/5066 709/224 |
| 2014/0068577 | A1 | 3/2014 | Gedik et al. | |
| 2014/0215184 | A1* | 7/2014 | Branson | G06F 15/80 712/30 |
| 2014/0278337 | A1* | 9/2014 | Branson | G06F 11/3457 703/22 |
| 2015/0256483 | A1* | 9/2015 | Bragstad | H04L 43/04 709/219 |

OTHER PUBLICATIONS

List of IBM Patents or Patent Applications Treated as Related.
Tatbul et al., Load Management and High Availability in the Borealis Distributed Stream Processing Engine, Lecture Notes in Computer Science, vol. 4540, p. 66-85, 2008.
Balazinska et al., Fault-Tolerance in the Borealis Distributed Stream Processing System, SIGMOD 2005, Baltimore Maryland, Jun. 14-16, 2005.
Hwang et al., A Cooperative, Self-Configuring High-Availability Solution for Stream Processing, IEEE 23rd Int'l Conference on Data Engineering, p. 176-185, 2007.
Zaharia et al., Discretized Streams; Fault-Tolerant Streaming Computing at Scale, Proceedings of the Twenty-Fourth ACM Symposium on Operating Systems Principles, p. 423-438, Nov. 3-6, 2013.
Qian et al, TimeStream: Reliable Stream Computation in the Cloud, Proceedings of the 8th ACM European Conference on Computer Systems, p. 1-14, Apr. 15-17, 2013.
Bellavista et al., Adaptive Fault-Tolerance for Dynamic Resource Provisioning in Distributed Stream Processing Systems, Proceedings of the 17th International Conference on Extending Database Technology, p. 85-96, Mar. 24-28, 2014.

* cited by examiner

RESTORATION OF CONSISTENT REGIONS WITHIN A STREAMING ENVIRONMENT

BACKGROUND

1. Technical Field

This disclosure generally relates to streaming applications, and more specifically relates to restoration of consistent regions of streaming applications in a streaming environment.

2. Background Art

Streaming applications are becoming more common due to the high performance that can be achieved from near real-time processing of streaming data. A streaming application is organized as a data flow graph consisting of multiple operators connected via stream connections that each process streaming data in near real-time. An operator typically takes in streaming data in the form of data tuples, operates on the tuples in some fashion, and outputs the processed tuples to the next operator in the flow graph. A subgraph is a portion of the flow graph of the application.

Because of business requirements, some applications require that all tuples in an application stream are processed at least once. A consistent region can be defined in streams processing to meet the requirements for at-least-once processing. A consistent region is a subgraph where the states of the operators become consistent by processing all the tuples within defined points on a stream. The consistent state comprises of a collection of persisted operator states that are consistent as having processed all tuples up to a certain logical point. On a failure, a consistent region is reset to its last successfully persisted state, and source/start operators of a region can replay any tuples submitted since the last persisted state. The replay enables applications to achieve at-least-once tuple processing.

Thus, at-least-once tuple processing includes the ability for different parts of the application to recover state and restart processing tuples. The ability to recover state and replay tuples enables the application to recover from failures. A consistent region thus identifies a subgraph of the application that can recover upon a failure if required. The potential downside to a recovery is that the upstream operators may backup with pending data or downstream operators may be flooded with replayed data. In addition, resources utilized by an application region during restore may become overwhelmed. This is apparent when a failure affects multiple consistent regions at the same time (e.g., a host failure) and the regions rely on a common resource for processing (e.g., a shared database) or a common node.

BRIEF SUMMARY

The disclosure and claims herein provide a streams manager that intelligently restores multiple consistent regions of streaming applications in a streaming environment to increase performance and reduce overloading of other operators and resources. The streams manager detects a failure that affects multiple consistent regions and determines a preferred schedule to restore the multiple consistent regions by analyzing the relationships of the operators and resources associated with the multiple consistent regions. The streams manager may create a dependency graph that maps the interrelationships of the operators and resources associated with the consistent regions of the streaming application and then consult the dependency graph to determine the schedule to restore the multiple consistent regions affected by the failure.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
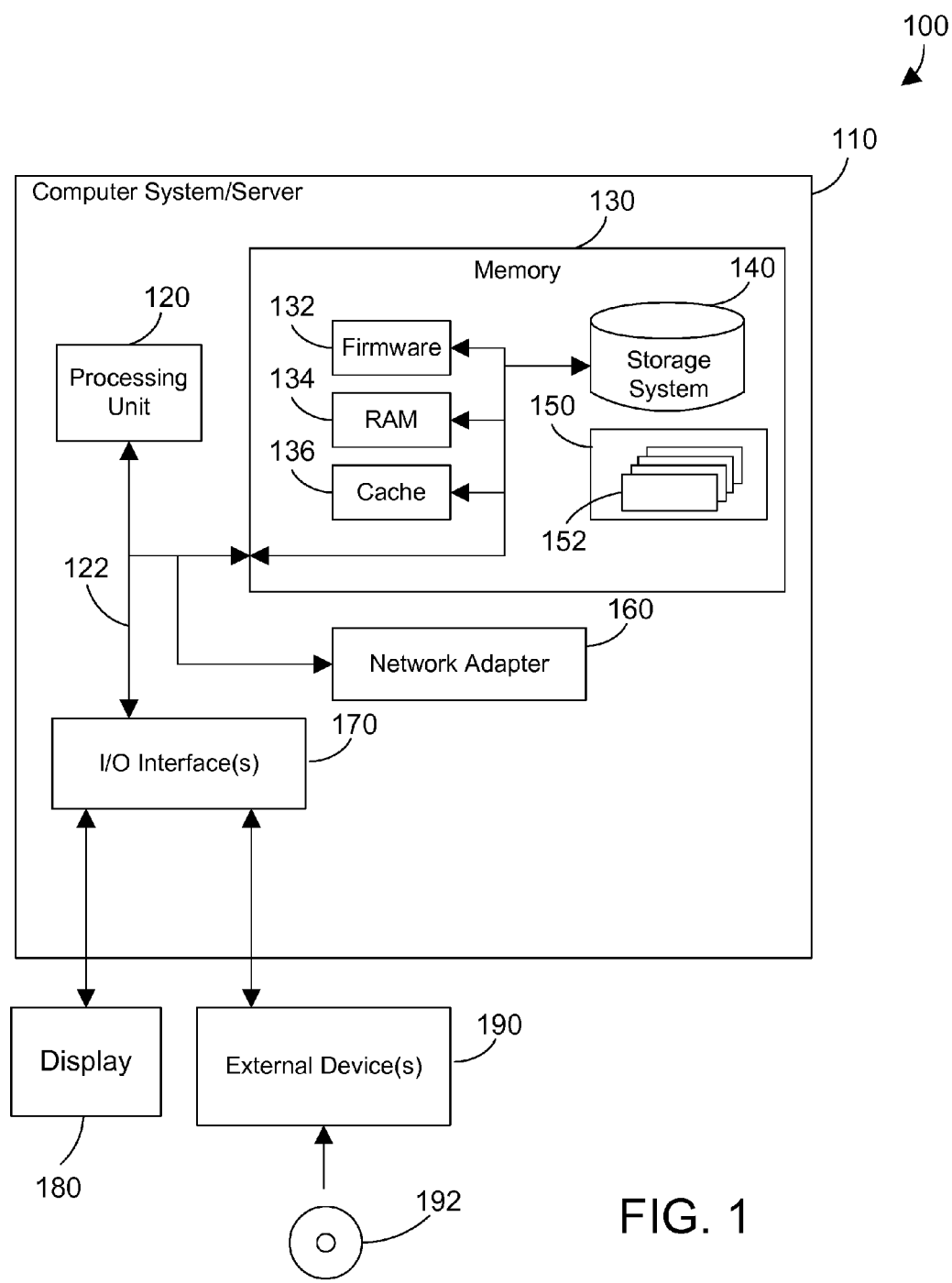
FIG. 1 is a block diagram of a cloud computing node.

The disclosure and claims herein relate to a streams manager that intelligently restores multiple consistent regions of streaming applications in a streaming environment to increase performance and reduce overloading of other operators and resources. The streams manager detects a failure that affects multiple consistent regions and determines a preferred schedule to restore the multiple consistent regions by analyzing the relationships of the operators and resources associated with the multiple consistent regions. The streams manager may create a dependency graph that maps the interrelationships of the operators and resources associated with the consistent regions of the streaming application and then consult the dependency graph to determine the schedule to restore the multiple consistent regions affected by the failure.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
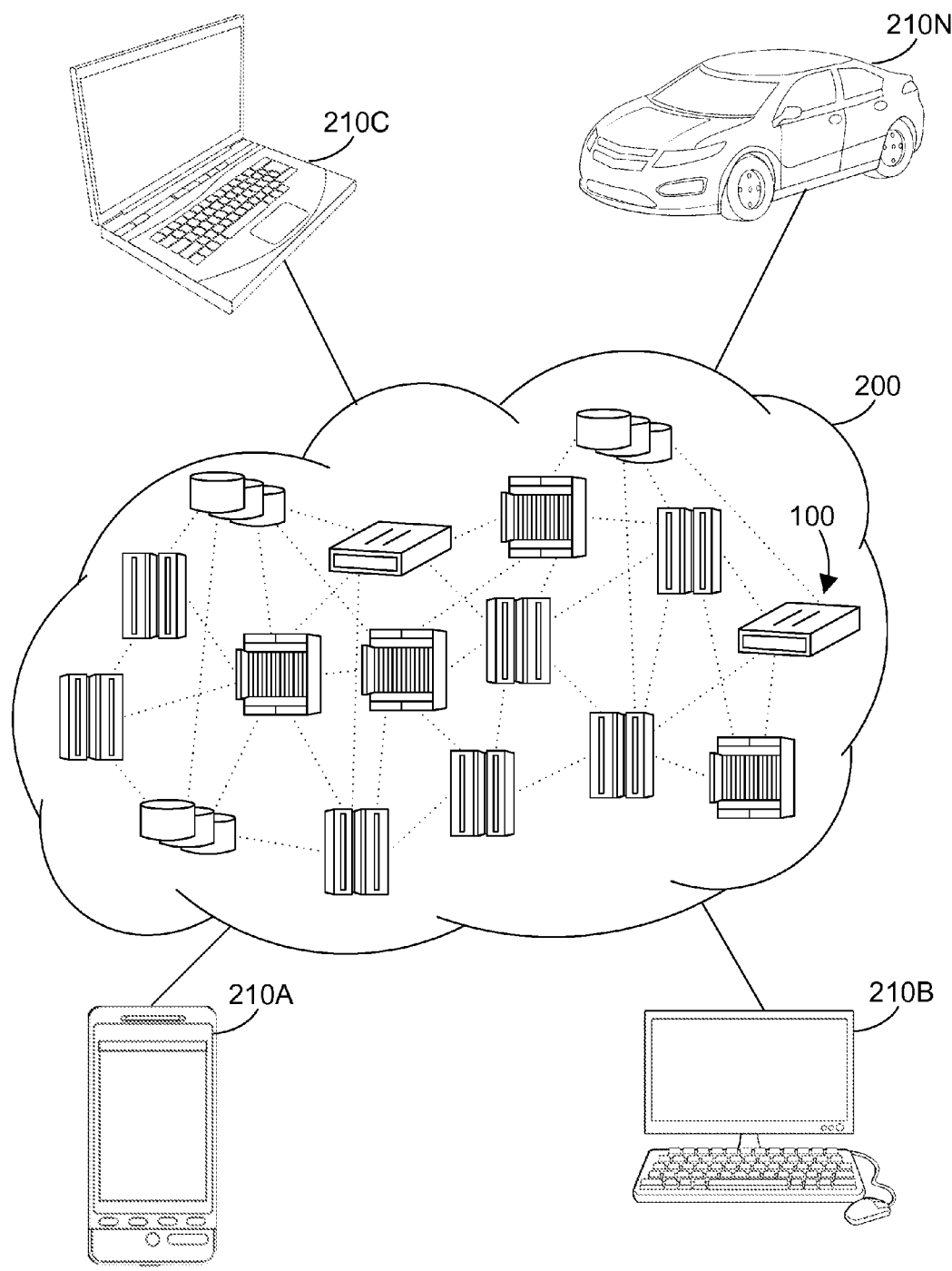
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
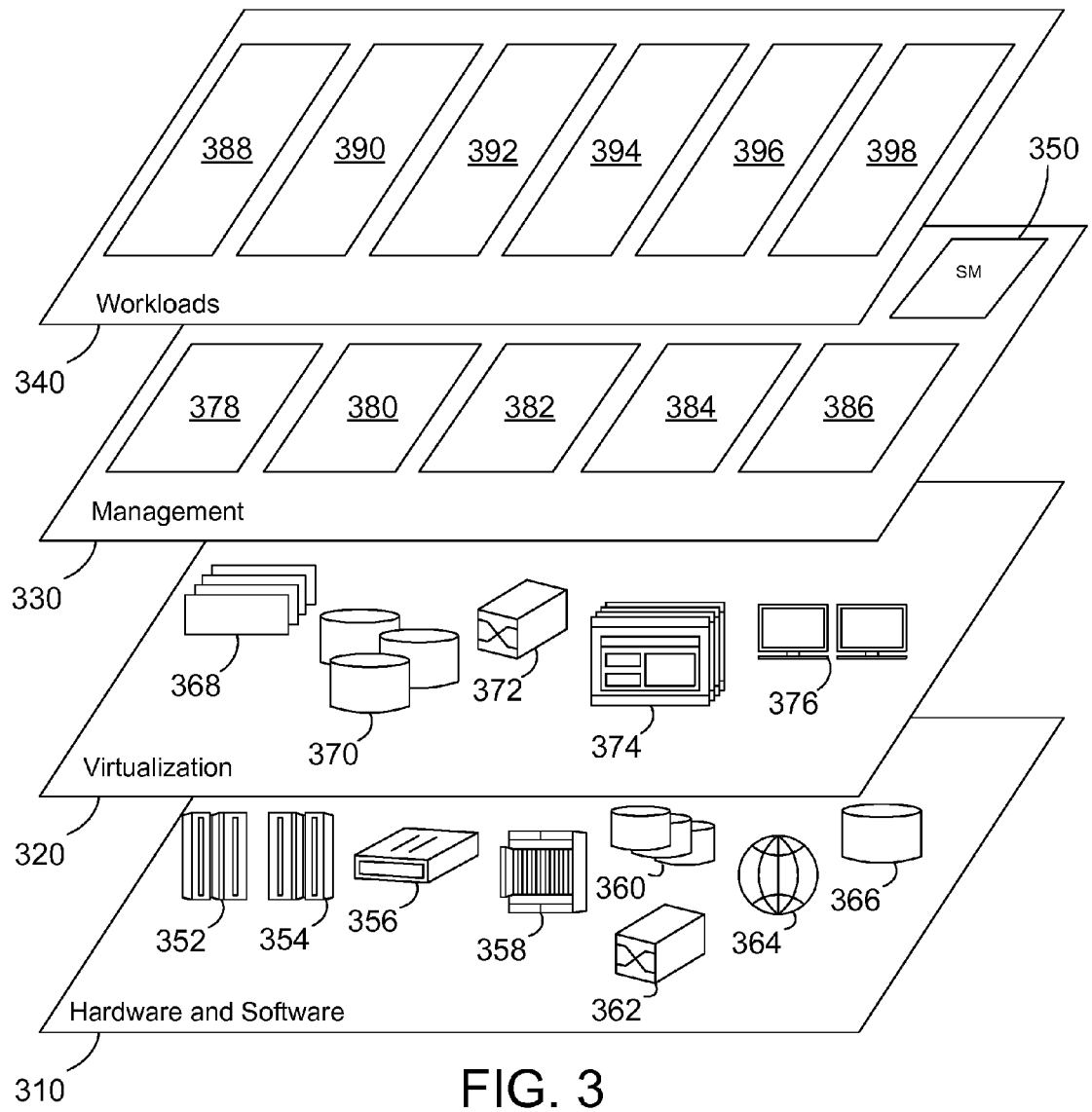
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 350 as described herein. While the SM 350 is shown in FIG. 3 to reside in the management layer 330, the SM 350 actually may span other levels such as the applications layer 340 shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
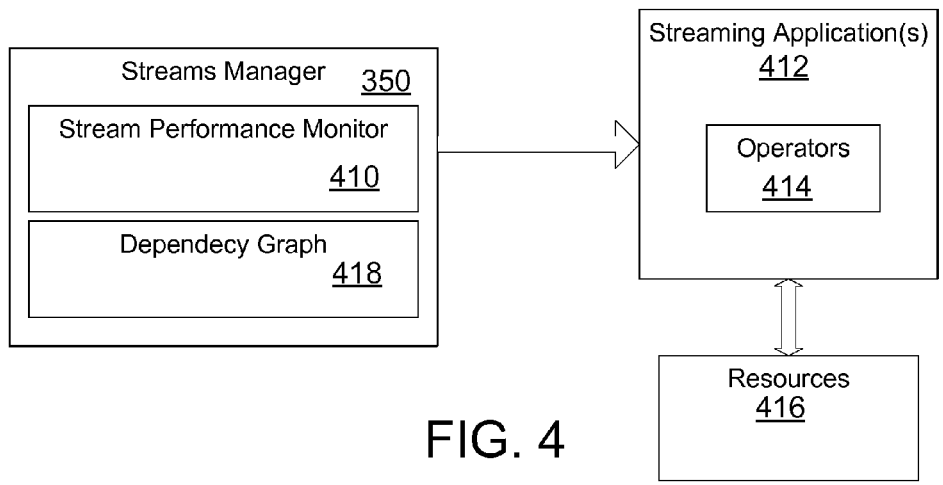
FIG. 4 is a block diagram showing an example of a streams manager that intelligently restores multiple consistent regions of a streaming application in a streaming environment as described herein.

FIG. 4 shows one suitable example of the streams manager 350 introduced in FIG. 3. The streams manager 350 is software that manages one or more streaming applications. The streams manager 350 includes a performance monitor 410 that monitors performance of the streaming application or applications 412. In this simplified example, the streams manager 350 manages streaming application 412. The streaming application 412 may comprise a number of operators 414 that may be represented in the form of a flow graph (not shown) as known in the prior art. The management of the streaming application(s) 412 includes managing operators and data flow connections between operators that are sometimes represented in the flow graph of the streaming application 412. The streaming application utilizes various resources 416 as described below. The streams manager 350 may include a dependency graph 418 that holds information about the streaming application 412. The stream performance monitor 410 monitors performance of the streaming application 410, and when there are failures that affect multiple consistent regions of the streaming application, the streams manager 350 determines a suitable or preferred order to restore the multiple consistent regions as described further below. The streams manager may consult the dependency graph 418 to determine the order to restore the multiple consistent regions of the operators 414 affected by the failure.

Again referring to FIG. 4, the dependency graph 418 includes dependency information about the operators 414 of the streaming application 412. The dependency graph 418 may be visualized as similar to a flow graph but contains additional dependency data stored in any suitable format. In addition to normal connection information like a flow graph, the dependency graph includes additional dependency information about the operators of a streaming application. As used herein, there are three main types of dependency information that may be included in the dependency graph, namely: operator dependencies, resource dependencies and node dependencies. Operator dependencies result from the topographical or logical arrangement of the operators 414. An operator dependency is where an operator or consistent region of operators is dependent on a common operator or shared operator for data input or output. An operator dependency may be determined from the normal flow graph and then may be stored in any suitable format such as a table or data file. The second type of dependency is a resource dependency. Any two operators or consistent regions that utilize a common resource have a shared resource dependency. Resources may include a database, a data storage device such as memory or disk drive, or a network connection. The third type of dependency is a node dependency. Two consistent regions or operators have a shared node dependency when they have operators that are physically placed to execute on a common node, cluster rack or processor. The streams manager may determine that consistent regions or operators have one or more of these shared dependencies as described in more detail below.

As introduced above, the streams manager 350 may create the dependency graph 418 with dependency information about the operators 414 of the streaming application(s) 412. In some cases, the dependency graph 418 may include a set of operators that cross an application boundary of application that share a resource. The dependency graph 418 may include the three types of dependencies discussed above and may additionally include other types of dependencies as well. The dependency graph may be created at compile time and then updated at runtime with additional dependency information. At run time the streams manager could add information such as physical location of the operators and dynamic connections of operators to resources. Operator fusion could also be considered in the dependency graph. Operator fusion is a known process where multiple operators are merged into a single processing element. If operator fusion is used the streams manager could take this into account when updating the dependency graph at runtime.

As discussed above, the streams manager 350 includes a performance monitor 410 to monitor the performance of a streaming application and the operators of the streaming application. With respect to the functions described in this application, the performance monitor 410 includes tracking performance of the streaming application's operators to determine when one or more operators of a streaming application have failed. Performance and failure of the operators can be determined in various ways. For example, an underperforming operator can be determined by comparing the operator performance against historical data. Logs and other records of performance indicators from the same or similar operators can be collected and compared to the current performance. Performance indicators could include for example: error rate, dropped tuple rate, response time, resource utilization, etc. Underperforming or failure could also be determined by comparing the relative performance of the operators. The relative performance could be determined by comparing to historical patterns or the percent of resources required by the different operators.

The streams manager 350 intelligently restores multiple consistent regions of a streaming application in a streaming environment to increase performance and reduce overloading of other operators and resources. The streams manager analyzes the relationships of the operators and resources associated with the streaming application to discover a mapping between the consistent regions and resources of the streaming application. The streams manager may create a dependency graph that maps the interrelationships of the operators and resources associated with the consistent regions of the streaming application. The streams manager then monitors execution of the application with the performance monitor to detect failures. When a failure that affects multiple consistent regions is detected, the streams manager determines a preferred order of recovery for the multiple consistent regions based on the dependencies of the operators, where the dependencies of the operators includes operator flow and consumption of resources of the various operators.

Figure 5:
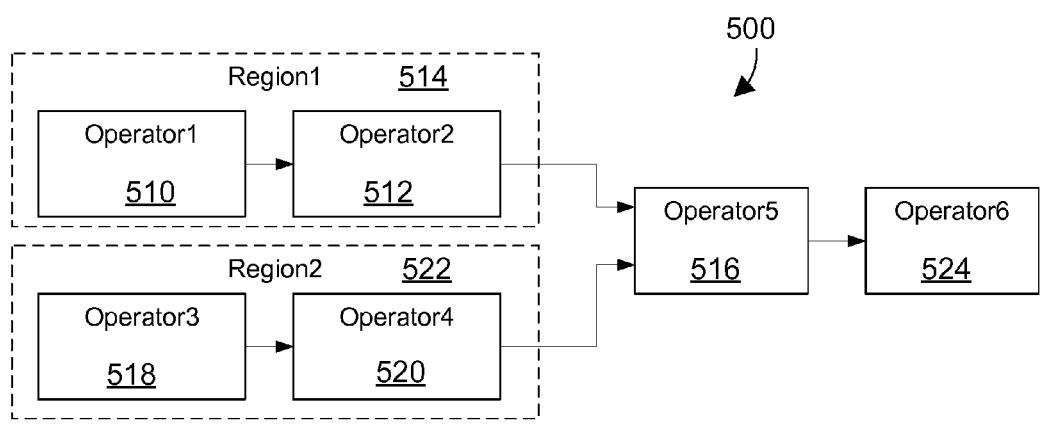
FIG. 5 illustrates a block diagram of a simplified example for intelligently restoring consistent regions of a streaming application.

FIG. 5 illustrates a block diagram that represents a simplified flow graph 500 to illustrate a first example of intelligently restoring multiple consistent regions of a streaming application (s). The flow graph 500 represents a streaming application that has six operators, operator1 510 through operator6 524. Operator1 510 and operator2 512 are located in a first consistent region 514 and operator3 518 and operator4 520 are located in a second consistent region 522. Operator1 510 originates a stream of tuples, which is processed by operator2 512 and output to operator5 516. Similarly, operator3 518 originates a stream of tuples, which is processed by operator4 520 and also output to operator5 516. Where consistent regions include operators from multiple applications, the order of recovery of the multiple consistent regions affected by the failure could be determined by a priority of the streaming applications, or the order of recovery could be determined by the application with the higher input data rate.

Again referring to FIG. 5, in this example, we assume that the stream performance monitor 410 detects that one or more operators in both consistent regions 514, 522 have a failure and need to be restarted. The streams manager determines that there are multiple consistent regions and analyzes the flow graph and dependency data to determine if there are dependencies for the consistent regions affected by the failure. If a dependency graph was created, the streams manager could use the dependency graph for this determination. In this example, the streams manager would determine that both of the consistent regions source data to a common operator, Operator5 516. Since the consistent regions source data to a common operator it may be important to restore the operators at the same time if operator5 is a join, meaning that it requires tuples from both input streams to be able to process tuples. Alternatively, if Operator 5 is a filter operation that does not require tuples from both input streams, the consistent regions could be restored independently to not overload a dependent operator or resource. The streams manager may use other factors to determine the order of recovery such as tuple rate of the operators, resources used, demand or the operators, etc. In this case, the streams manager may determine to first restart consistent region1 514 or region2 522.

Figure 6:
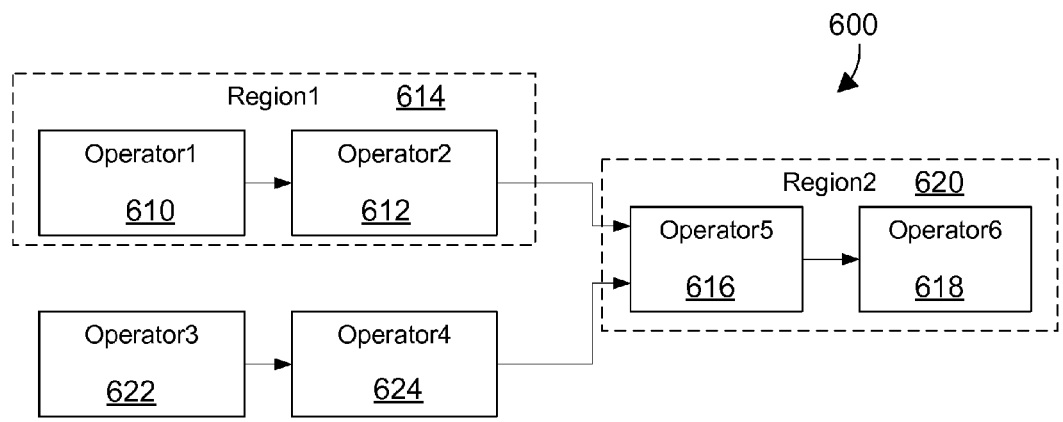
FIG. 6 illustrates a block diagram of another simplified example for intelligently restoring consistent regions of a streaming application.

FIG. 6 illustrates a block diagram that represents a simplified flow graph 600 to illustrate another example of intelligently restoring multiple consistent regions of a streaming application. The flow graph 600 represents a streaming application that has six operators, operator1 610 through operator6 618. Operator1 610 and operator2 612 are located in a first consistent region 614. Operator5 616 and operator6 618 are located in a second consistent region 620.

Operator1 610 originates a stream of tuples, which is processed by operator2 612 and output to operator5 616. Similarly, operator3 622 originates a stream of tuples, which is processed by operator4 624 and also output to operator5 616. In this example, we assume that the stream performance monitor 410 detects that one or more operators in both consistent regions 614, 620 have a failure and need to be restarted. The streams manager determines that there are multiple consistent regions and analyzes the flow graph and dependency data to determine if there are dependencies for the failed consistent regions. The streams manager determines that consistent region2 620 is dependent on consistent region1 614. Based on the determination of dependencies the streams manager determines the order of recovery. In this case, the streams manager may determine to first restart consistent Region2 620 since Operator5 616 has to replay data to recover and it can't process any new data from upstream operators until it recovers.

Figure 7:
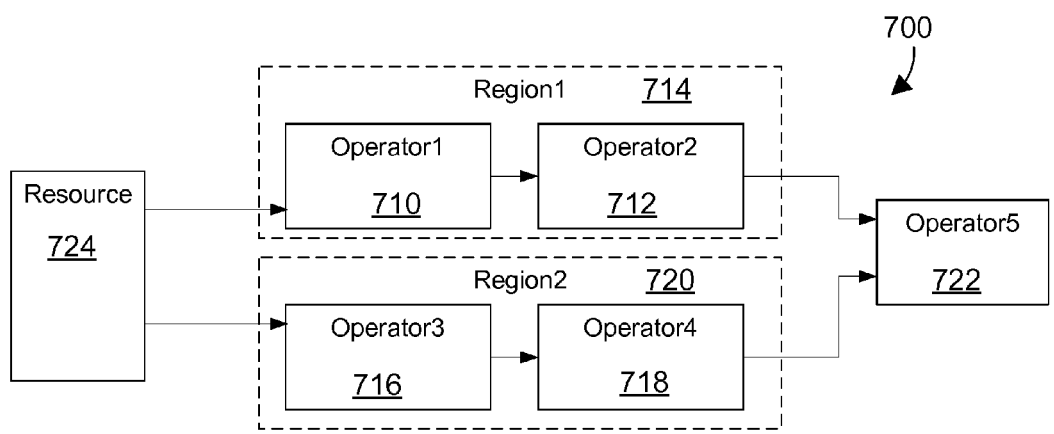
FIG. 7 illustrates a block diagram of another simplified example for intelligently restoring consistent regions of a streaming application.

FIG. 7 illustrates a block diagram that represents a simplified flow graph 700 to illustrate another example of intelligently restoring multiple consistent regions of a streaming application. The flow graph 700 represents a streaming application that has five operators, operator1 710 through operator5 722. Operator1 710 and operator2 712 are located in a first consistent region 714 and operator3 716 and operator4 718 are located in a second consistent region 720. Operator1 710 originates a stream of tuples, which is processed by operator2 712 and output to operator5 722. Similarly, operator3 716 originates a stream of tuples, which is processed by operator4 718 and also output to operator5 722. In this example, we assume that the stream performance monitor 410 detects that one or more operators in both consistent regions 714, 720 have a failure and need to be restarted. The streams manager determines that there are multiple consistent regions and analyzes the flow graph and dependency data to determine if there are dependencies for the failed consistent regions. In this example, the streams manager would determine that both of the consistent regions have a common resource 724. The common resource 724 may be a database or network resource that provide resources consumed by both regions 714, 720. The streams manager then uses the dependencies to determine the order of recovery. In this case, the streams manager may determine to first restart consistent region1 714 or region2 720 depending on demand for the operator or the average recovery time of the regions.

Figure 8:
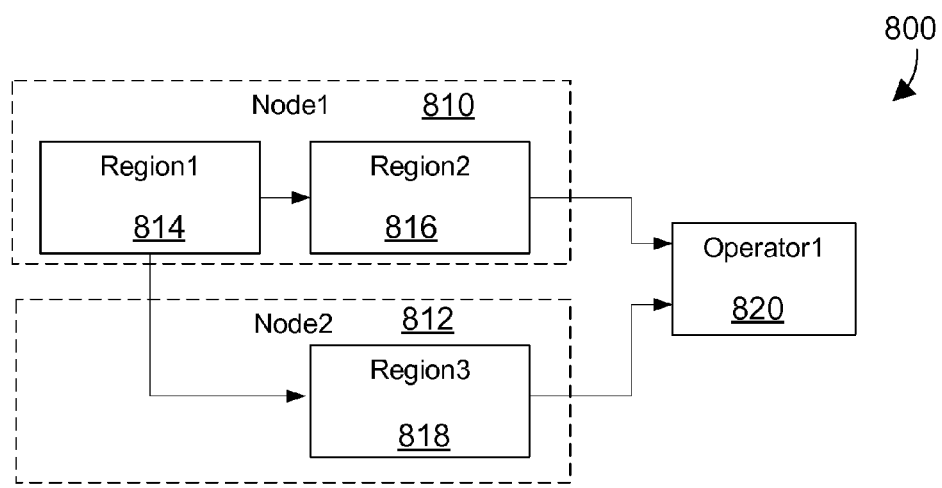
FIG. 8 illustrates a block diagram of another simplified example for intelligently restoring consistent regions of a streaming application.

FIG. 8 illustrates a block diagram that represents a simplified flow graph 800 to illustrate another example of intelligently restoring multiple consistent regions of a streaming application. The flow graph 800 represents a streaming application that has operators on two different physical computer nodes 810, 812. Consistent region1 814 and consistent region2 816 are on node1 810. A third consistent region, region3 818 is on node2 812. Operator2 820 receives data from region1 816 and region2 818. When the stream performance monitor 410 detects that one or more operators in the consistent regions 814, 816, 818 have a failure and need to be restarted, the streams manager analyzes the flow graph and dependency data to determine dependencies for the failed consistent regions. In this example, the streams manager would determine that the consistent region3 818 is located on a different node. In this case, the streams manager may determine to simultaneously restart consistent region2 816 and region3 818 since they are on different resource nodes and then restart region1 814.

Figure 9:
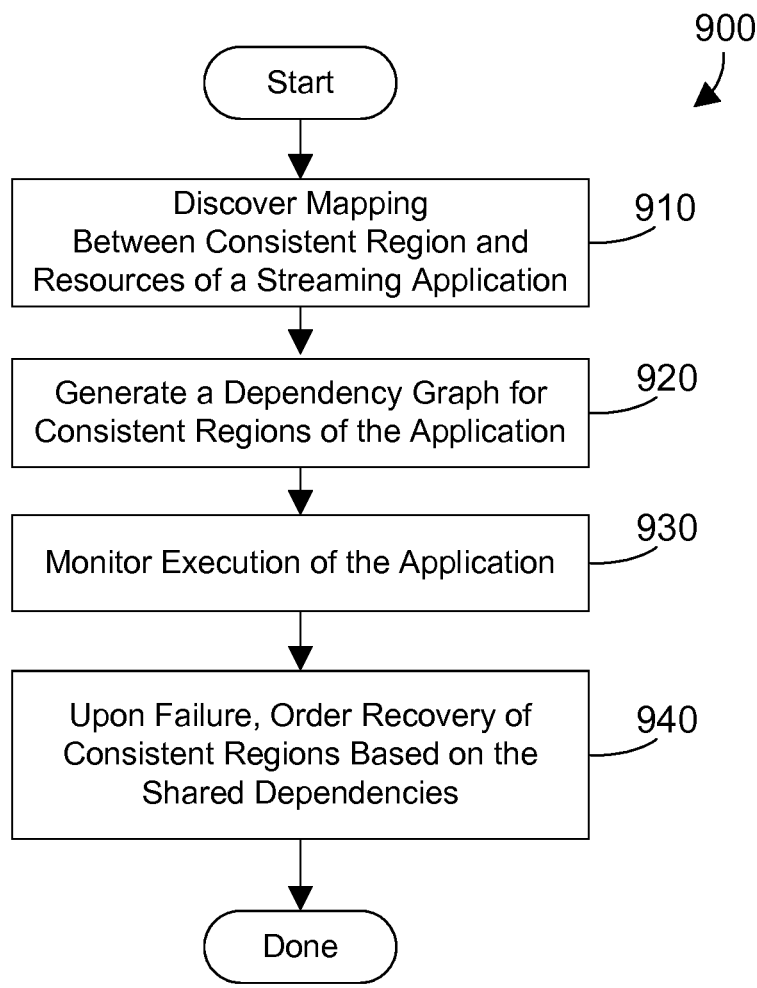
FIG. 9 is a flow diagram of a method for a streams manager to intelligently restore consistent regions of a streaming application.

Referring to FIG. 9, a method 900 shows one suitable example for enhancing failure recovery a streaming application. Method 900 is preferably performed by the streams manager 350. The streams manager discovers the mapping between consistent regions and resources of a streaming application (step 910). The streams manager generates a dependency graph for regions of the application (step 920). The streams manager then monitors execution of the application (step 930). When there is a failure, order recovery of the consistent regions based on the dependency graph and resource consumption of the operators in the regions. The method is then done.

Figure 10:
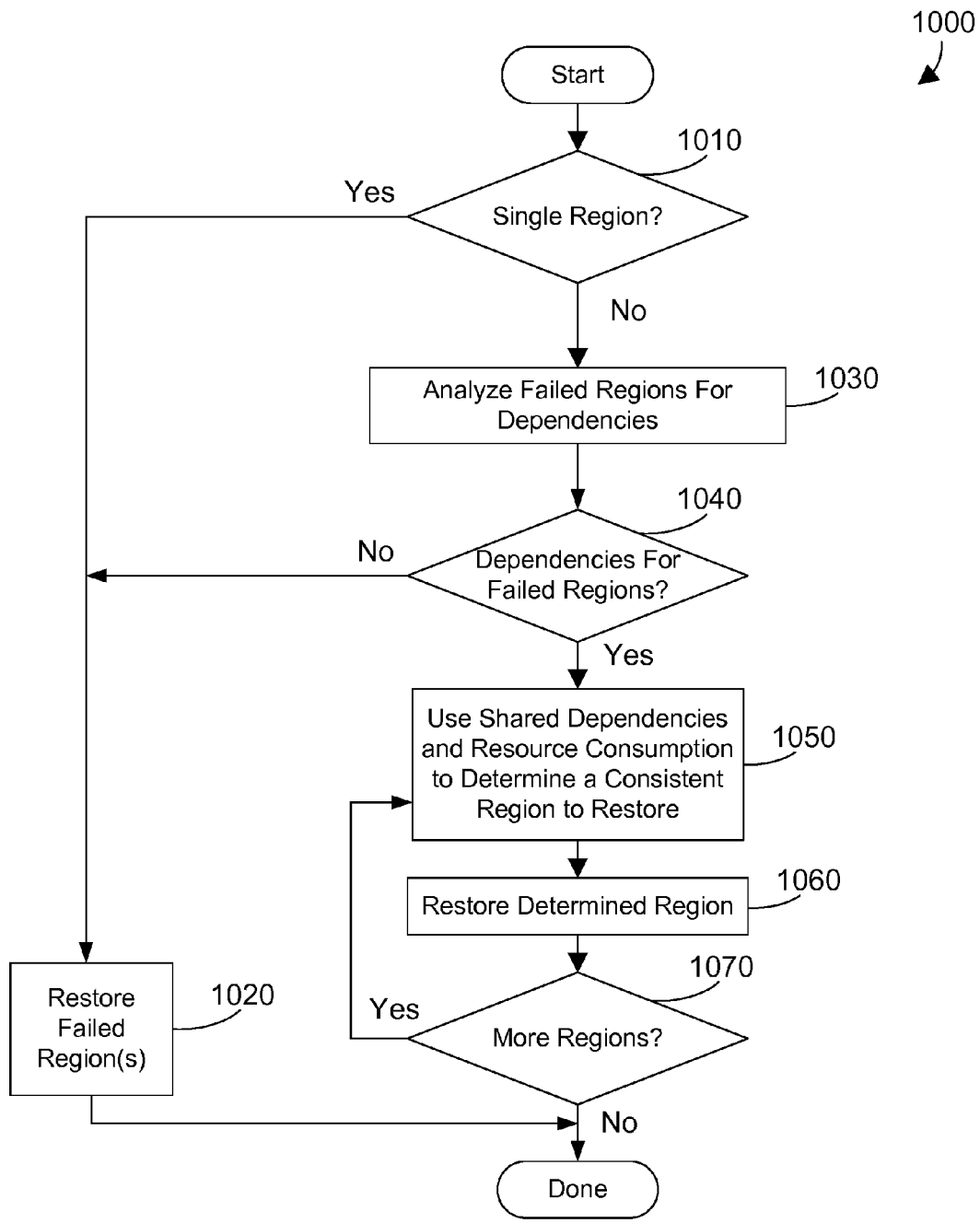
FIG. 10 is a flow diagram of a specific method for step 940 in FIG. 9.

FIG. 10 shows one suitable example of a method for a streams manager to order recovery of consistent regions. Method 1000 thus shows a suitable method for performing step 940 in method 900. First determine if there is a single failed consistent region (step 1010). If there is a single failed consistent region (step 1010=yes) then restore the failed region (step 1020). If there is not a single failed consistent region (step 1010=no) then analyze the failed regions for dependencies (step 1030). If there are no dependencies for the failed regions (step 1040=no) then restores the failed regions (step 1020). If there are dependencies for the failed regions (step 1040=yes) then use dependencies and/or resource consumption to determine a consistent region to restore (step 1050) and then restored the determined region (step 1060). If there are more regions to restore (step 1070=yes) then return to step 1050. If there are no more regions to restore (step 1070=no) then the method is then done.

Figure 11:
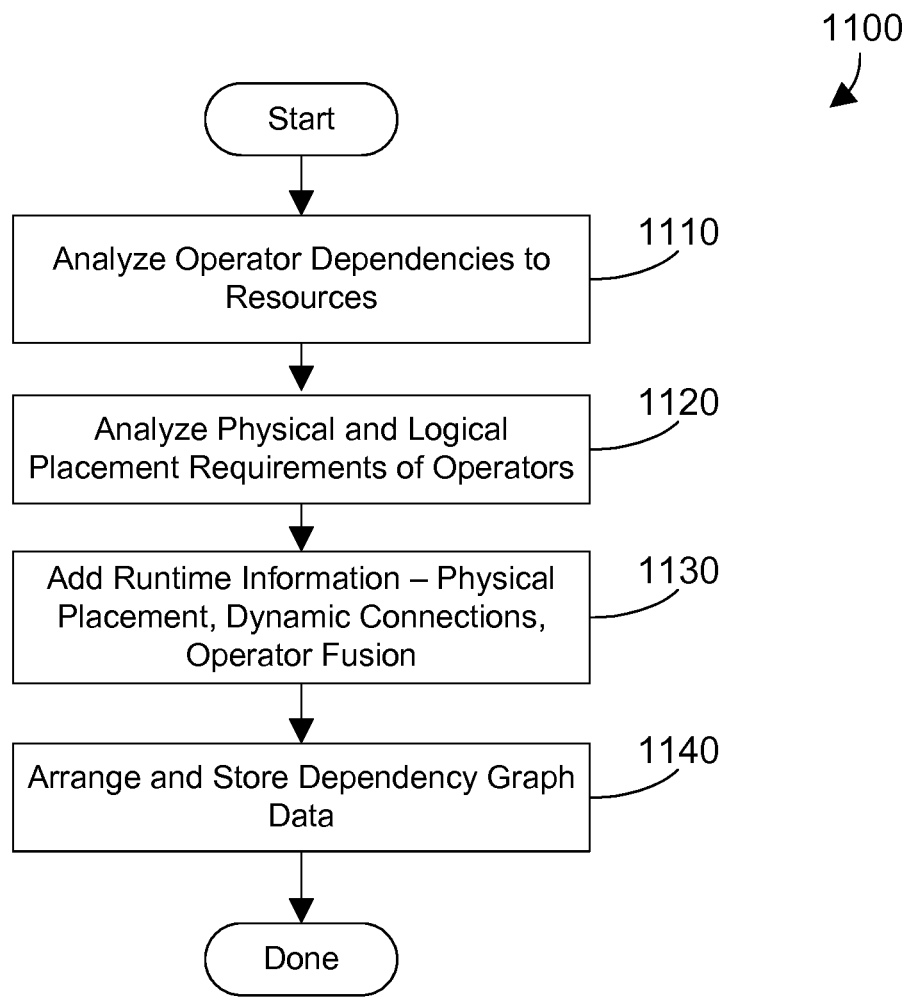
FIG. 11 is a flow diagram of a specific method for step 920 in FIG. 9.

FIG. 11 shows one suitable example of a method for a streams manager to generate a dependency graph for consistent regions of an application. Method 1100 thus shows a suitable method for performing step 920 in method 900. First, analyze operator dependencies to resources (step 1110). Analyze physical and logical placement requirements of operators (step 1220). Add runtime information such as physical placement, dynamic connections and operator fusion (step 1130). Arrange and store the dependency graph data in a suitable format (step 1140). The method is then done.

The disclosure and claims herein relate to a streams manager that intelligently restores multiple consistent regions of streaming applications in a streaming environment to increase performance and reduce overloading of other operators and resources. The streams manager detects a failure that affects multiple consistent regions and determines a preferred schedule to restore the multiple consistent regions by analyzing the relationships of the operators and resources associated with the multiple consistent regions. The streams manager may create a dependency graph that maps the interrelationships of the operators and resources associated with the consistent regions of the streaming application and then consult the dependency graph to determine the schedule to restore the multiple consistent regions affected by the failure.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
at least one processor;
a memory coupled to the at least one processor;
at least one streaming application residing in the memory and executed by the at least one processor, the at least one streaming application comprising a flow graph that includes a plurality of operators that process a plurality of data tuples; and a streams manager residing in the memory and executed by the at least one processor, wherein the streams manager monitors performance of the plurality of operators of the at least one streaming application and detects a failure that affects multiple consistent regions of the flow graph, and orders recovery of the multiple consistent regions based on dependencies of the multiple consistent regions.

2. The apparatus of claim 1 wherein the streams manager generates a dependency graph for the plurality of operators and the multiple consistent regions of the streaming application.

3. The apparatus of claim 2 wherein the dependency graph includes operator dependencies, resource dependencies and node dependencies.

4. The apparatus of claim 2 wherein the streams manager creates the dependency graph at compile time and then updates the dependency graph at runtime to include runtime information.

5. The apparatus of claim 4 wherein the runtime information includes physical location of the operators and dynamic connections.

6. The apparatus of claim 1 wherein the streams manager determines to recover a downstream operator before an upstream operator.

7. The apparatus of claim 1 wherein the multiple consistent regions are a subgraph of a flow graph for the streaming operation where the states of the operators become consistent by processing all the tuples within defined points on a stream.

8. The apparatus of claim 1 wherein the at least one streaming application comprises a first streaming application and a second streaming application that share a resource; wherein at least one consistent region of the multiple consistent regions include operators from the first streaming application and the second streaming application, and wherein the recovery of the multiple consistent regions is determined by a priority of the first and second streaming applications.

* * * * *